United States Patent [19]

Kraybill

[11] Patent Number: 5,204,889
[45] Date of Patent: Apr. 20, 1993

[54] APPARATUS FOR MEASURING THICKNESS OF METALS ON A ROLLING MILL

[75] Inventor: John Kraybill, Cockeysville, Md.

[73] Assignee: Loral Fairchild Corp., Syosset, N.Y.

[21] Appl. No.: 912,855

[22] Filed: Jul. 14, 1992

[51] Int. Cl.$^5$ .............................................. G01B 15/02
[52] U.S. Cl. ........................................ 378/54; 378/51; 378/53
[58] Field of Search ...................... 378/51, 53, 54, 55, 378/56, 58, 50, 88, 89, 45; 250/370.06, 370.09, 370.11, 370.14

[56] References Cited

U.S. PATENT DOCUMENTS

| | | | |
|---|---|---|---|
| 2,938,520 | 5/1960 | Powell | 131/21 |
| 3,121,166 | 2/1964 | Vossberg | 250/83.3 |
| 3,569,708 | 3/1971 | Weinbaum | 250/83.3 |
| 3,844,870 | 10/1974 | Donoghue et al. | 156/360 |
| 4,037,104 | 7/1977 | Allport | 250/359 |
| 4,047,029 | 9/1977 | Allport | 250/273 |
| 4,510,577 | 4/1985 | Tsujii et al. | 375/54 |
| 4,511,799 | 4/1985 | Bjorkholn | 250/370.06 |
| 4,599,514 | 7/1986 | Cho | 378/53 |
| 5,138,167 | 8/1992 | Barnes | 250/370.06 |

OTHER PUBLICATIONS

J. F. Williams, "Low Alloy Sensitivity X-Ray" presented at the Finish-Fabrication Technology Seminar, May 7, 1990.
J. J. Allport, N. L. Brouwer & R. A. Kramer, "Backscatter/Transmission X-Ray Thickness Gauge", NDT International, vol. 20, No. 4, Aug. 1987.
"Registration Record of International Alloy Designations and Chemical Composition Limits for Wrought Aluminum and Wrought Aluminum Alloys", Revised: Jun. 1, 1980, The Aluminum Association.
"Methods for Minimizing the Composition of X- and Gamma-Ray Thickness Gauges", Session Organizer: R. P. Gardner (NCSU), pp. 141-148, no date.
J. J. Allport, "Eliminating X-Ray Thickness Gauge Composition Errors", Lockheed Missiles & Space Co., Inc. no date.
"Application of Radiation Gauging for Measuring the Thickness of Aluminum Flat-Rolled Products", Session Organizer: R. P. Gardner (NCSU), pp. 149-152 no date.

Primary Examiner—David P. Porta
Attorney, Agent, or Firm—Sterne, Kessler, Goldstein & Fox

[57] ABSTRACT

An apparatus and method for gauging the thickness of a moving sheet material, typically a metal, which has a variable alloy composition over its length. This is accomplished by measuring the spectral energy of a radiation beam which has not been absorbed by the material and passed perpendicularly through the material by utilizing a length absorption filter radiation detector. The length absorption filter spectrally filters the radiation into separate wavelengths and measures the intensity of these wavelengths. Electrical outputs representing these measured values is output to a processor which then determines the thickness of the material based on the transmission ratios measured for each measured energy band and the absorption coefficients of the elements in the material. This result is then used to control the rolling mill to provide real-time on-line feedback.

14 Claims, 3 Drawing Sheets

APPARATUS FOR MEASURING THICKNESS OF METALS ON A ROLLING MILL

BACKGROUND OF THE INVENTION

1. Field of the Invention

This invention relates generally to the field of measuring the thickness of flat-rolled sheet material in a rolling mill. More specifically, this invention relates to a non-contact radiation attenuation gauge which is insensitive to variations in alloy composition.

2. Related Art

In the manufacturing of flat-rolled metal materials such as aluminum, steel, brass, copper, and stainless steel, a critical concern is meeting delivery specifications within very strict tolerances while maintaining a high production rate. Flat-rolled materials which are too thick raise manufacturing material costs and materials which are too thin have to be reworked to meet the desired specifications.

Most rolling mills have some form of control system for controlling the thickness of its flat-rolled products. These control systems must be able to control the rolling mills in times of approximately 0.1 seconds or less and are required to gauge thickness with an accuracy of approximately +/−0.25%. These systems have utilized either one of two gauging techniques: contacting mechanical gauge or non-contacting radiation gauge techniques.

Contacting mechanical thickness measurement techniques are undesirable because the sensor elements which are in contact with the material may score or mark the material. In addition, the sensor element may skip or bounce when the sheet material reaches high sheet speeds. This results in inaccurate measurements or damage to the sensor if the sheet material should flutter.

Non-contacting radiation gauges such as radioisotope, beta-ray, x-ray, and gamma ray gauges are more prominent today. However, some of these systems have also had difficulty in meeting the high measurement and time tolerances required. The accuracy of radiation gauges is affected by material and environmental conditions including air gap temperature and distance, the presence of rolling solution or oil on the material, passline height variations, material composition variations, and sheet flutter.

Beta-ray gauges, which are used in some sheet and foil mills, have been known for their relative non-responsiveness to alloy composition variations. However, because the beta gauge utilizes high energy electrons of discrete mass to measure the density of the material, the beta ray is sensitive to the density of any materials in its path. This makes the beta gauge impractical for rolling mill operations where the beta ray's sensitivity to air density, rolling mill solutions, and oil film reduces its accuracy. This sensitivity to air density requires the air gap distance to be relatively small, bringing the beta-ray source and detector in close proximity to the sheet material. This exposes the gauge to damage if the sheet should flutter and also causes misalignment over short periods of time due to the high kinetic energy generated at rolling mill speeds. Also, beta gauges require a signal averaging time of approximately 5 seconds to achieve the required accuracy. This prevents the gauge from generating the required measurements within the time tolerances required in rolling mill operations.

Radioisotope gauges have been employed with moderate success in these applications. However, they have a low radiation intensity resulting in fewer electrons being transmitted. This increases the signal to noise ratio and signal processing times to values where optimum results are not obtainable in the time required. As a result, radioisotope gauges are best utilized under conditions where slow speed control of the measuring process is sufficient.

The majority of the above problems are overcome when the measurement is performed using photons generated by X-ray or gamma ray sources of suitable energy and intensity. The X-ray source is the best method of producing photons since the energy and intensity of the device are adjustable to obtain optimum signal-to-noise ratios. The high intensity beam which is produced allows the X-ray gauge to do signal averaging in approximately 0.01 to 0.005 seconds, thereby meeting the time response requirements necessary for high speed process control. The X-ray gauge is also unaffected by the density of air or other materials in its path. However, conventional techniques using x-ray guages are sensitive to alloy composition variations.

In the typical configuration, the X-ray transmission gauge includes a source of radiation on one side of the sheet material and a detector on the opposite side. The X-ray gauge determines the thickness of the material by measuring the intensity of the radiation which has penetrated the material. From this, the intensity of the radiation which is absorbed by the material can be determined. The intensity of radiation absorbed by an element of the material is determined by its thickness absorption coefficient which is a function of the frequency of the radiation.

It is not uncommon for the sheet materials to contain varying amounts of alloys which have different absorption coefficients than that of the principle sheet material. In the conventional single beam or single energy band radiation thickness gauge, a change in the composition of the material changes the material's overall radiation absorption, which appears as a change in thickness to the instrument.

There have been several attempts to desensitize the X-ray gauges to alloy composition. Most of these have relied on some form of spectral analysis to determine the chemical composition of the metal, and a compensation circuit or algorithm to combine the results of this measurement with the measurement of the X-ray attenuation. To perform a spectral analysis, backscatter techniques have been used by placing a detector at an angle on the same side of the metal to measure the amount of radiation which is reflected off the metal surface. The results of the backscatter system are used to modify the results of the attenuation system. The time required for this compensation technique, however, is not within the tolerances discussed above.

Other systems have used two different sources, each having a different energy level to determine the shift in absorption properties to compensate for the alloy composition. U.S. Pat. No. 4,037,104 to Allport appears to show an X-ray transmission gauge utilizing two energy sources and two detectors. While this device increases the accuracy of the measurements as compared to a single energy source, the additional source and detector are costly. Allport also appears to disclose an alternative embodiment of two detectors stacked in line with each other in the '104 device. The two detectors are positioned so that the X-ray beam penetrates both of them. The sections of the stacked detector are separated by filters to allow only a certain portion of the energy spectrum to pass through the first detection stage and enter the remaining stage. This technique is expensive to implement due to the material and tolerance requirements placed upon the filters. Also, the use of only two radiation sources neglects important alloy elements and is therefore, not as accurate as the proposed invention.

The basis of any spectral analysis is the filtering process that is utilized. For example, some systems have used a multichannel analyzer which converts electric pulses proportional to the X-ray photon's energy into a numeric value used to produce a spectral histogram. This is excellent for small numbers of photons, since the multichannel analyzer is limited to a maximum of approximately 80,000 pulses per second. This small number of photons requires a low flux density radiation source. For a fast response and a low signal-to-noise ratio, however, a large flux density is required. This in turn will result in more photons than the multichannel analyzer can support.

What is needed is a cost effective X-ray transmission device which has the capability to provide measurements of the true thickness of a sheet material during the rolling of a coil, wherein both the thickness and the composition may change independently.

SUMMARY OF THE INVENTION

The present invention is directed to an apparatus and method for gauging the thickness of a moving sheet of material, typically a metal which has a variable alloy composition over its length. This is accomplished by measuring the spectral energy of the radiation which has not been absorbed by the material at different energy bands.

A source of penetrative radiation is positioned in such a manner as to provide the radiation beam perpendicularly through the sheet material whose localized mass per unit area or instantaneous thickness is to be measured as the sheet is moving. A radiation detector is positioned on the opposite side of the sheet material from the radiation source to measure the beam attenuation. The radiation detector is a length absorption filter (LAF) which provides a means for spectrally filtering the radiation into separate wavelengths. The intensity of each of these wavelengths is then measured and electrical outputs are provided representing these measured values. A processor then determines the thickness of the material based on the values of these outputs. This result is then used to control the rolling mill to provide real-time, on-line feedback.

It is an advantage of the present invention to require only a single source and a single detector, thereby making this invention more cost effective than the conventional solutions.

It is a further advantage of the present invention that only the attenuation of the radiation is required to be measured. This increases the speed and accuracy of the device and reduces the need to have the source and detector in close proximity to the material being measured.

It is a further advantage of the present invention that it is more accurate since many energy levels can be measured simultaneously.

Further features and advantages of the present invention will become more readily apparent from the following detailed description when taken in conjunction with the accompanying drawings.

BRIEF DESCRIPTION OF THE DRAWINGS

The foregoing and other objects, features and advantages of the present invention should become apparent from the following description when taken in conjunction with the accompanying drawings, in which.

DETAILED DESCRIPTION OF THE PREFERRED EMBODIMENT

The preferred embodiment of the present invention is now described with reference to the figures, where like reference numbers indicate like elements.

Figure 1:
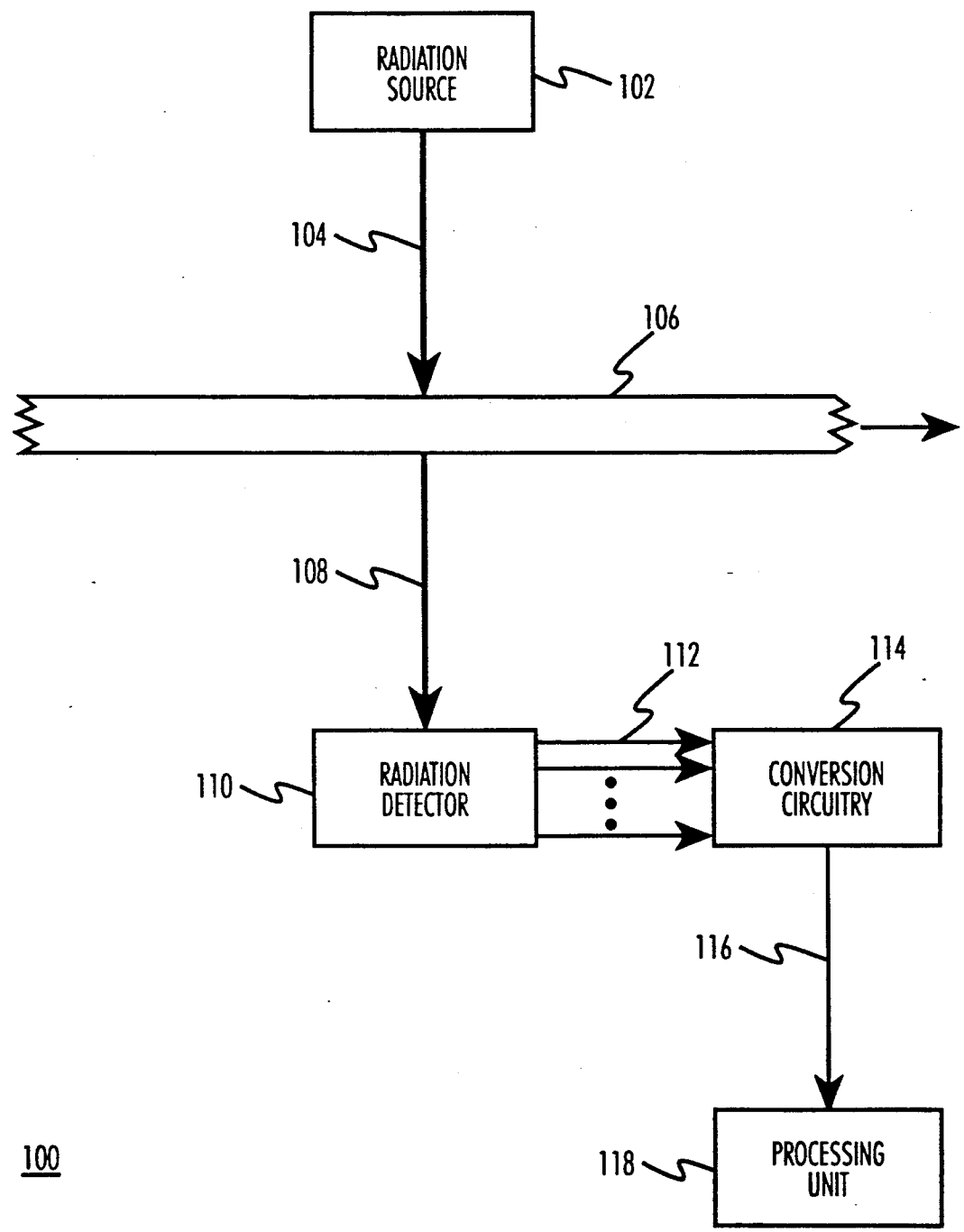
FIG. 1 is a plan view of a thickness gauge apparatus.

The present invention provides a means for measuring the thickness of a flat-rolled material with variations in alloy composition by evaluating the spectral absorption of polychromatic radiation by the material at more than one wavelength. This is done by measuring the spectral energy of the radiation which has not been absorbed by the material by utilizing an absorption means which separately absorbs individual wavelengths. The intensity of the radiation beam in each of these wavelengths is then measured. Referring to FIG. 1, an embodiment of radiation thickness gauge 100 is shown. A radiation source 102 which produces a polychromatic radiation beam is separated from radiation detector 110. The separated space between the radiation detector 110 and the radiation source 102 defines the inspection field. Radiation source 110 produces a collimated polychromatic radiation beam 104 with sufficient energy to penetrate the material 106 to be measured. The material 106 can be any flat-rolled sheet product in a rolling mill such as steel, brass, aluminum, paper or plastic. However, one should know that the present invention may also be used in non-rolling mill environments. In such applications, the material to be measured may be, but is not limited to concrete, wood, or living tissue.

The attenuated X-ray beam 108 which has penetrated material 106 is received by radiation detector 110. The radiation detector 110 measures the intensity of a plurality of energy bands of the received polychromatic radiation beam and transmits these values as continuous analog signals 112 to a converter circuitry 114. Converter circuitry 114 converts the analog signals received from the radiation detector 110 to digital signals 116 for the computing means 116. The thickness measurements are observed with respect to the width or traverse dimension of material 106, which is a direction perpendicular to the longitudinal direction of the strip movement as the strip proceeds past the apparatus.

In the preferred embodiment of the present invention, the source of radiation is a DC energized X-ray generator which generates a polychromatic X-ray radiation beam. However, radiation source 102 may also be, but not be limited to, a gamma-ray, radioisotope, or other source of radiation, depending on the material being measured and the speed at which the measurement must take place. In the preferred embodiment, X-ray source 102 generates a radiation beam having a large number of energy bands with a frequency spacing between the bands large enough to prevent different alloys from having the same thickness absorption coefficient for neighboring frequencies.

In the preferred embodiment of the present invention, the radiation detector 110 is a length absorption filter capable of differentiating between the different energy bands of attenuated X-ray beam 108 and producing output signals 112 representing the intensity of each of these energy bands. The radiation detector 110 contains amplifiers which convert the current generated by the length absorption filter to an analog voltage. The voltage is coupled with the processing unit 118 via analog to digital converters located in conversion circuitry 114. The resulting digital signals are transmitted from conversion circuitry 114 to processing unit 118 via digital signal line 116. The processing unit 118 may alternatively be a control circuitry having logic and memory capability, a special process computer, or a microprocessor, without changing the function of the invention.

Figure 2:
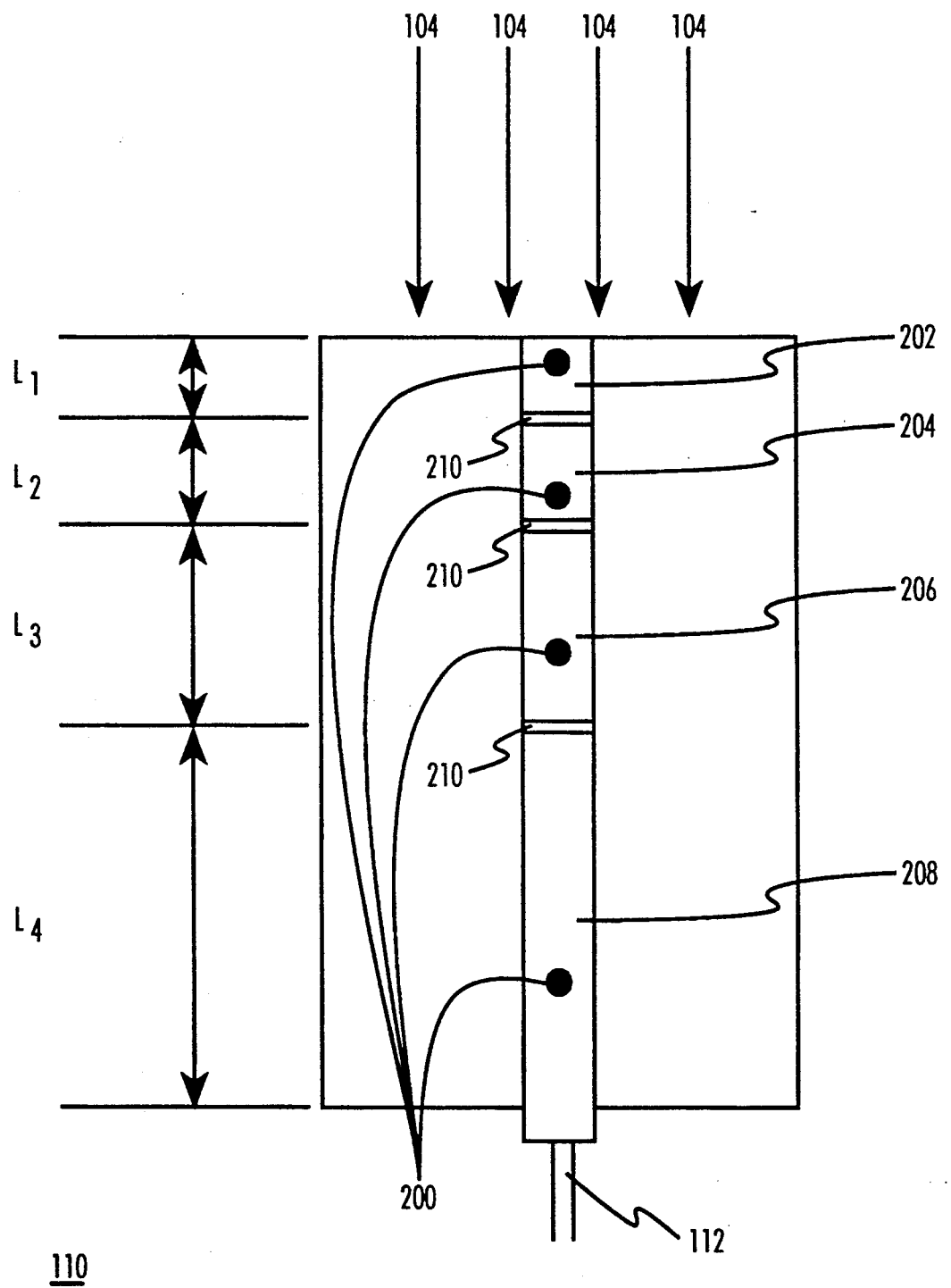
FIG. 2 is a side perspective of a length absorption filter radiation detector implemented as a multistage ion chamber with no division between the stages.

FIG. 2 illustrates a side view of length absorption filter radiation detector 110 implemented as a multi-stage ion chamber having a centrally located electrode 200. Electrode 200 consists of a number of different segments 202 through 208 each of different lengths corresponding to the length of the stage it is contained within. A section of the ion chamber with its associated length of electrode defines a stage of the length absorption filter. Radiation detector 110 is positioned such that the collimated polychromatic radiation beam 104 passes through each of the stages of the length absorption filter. This positioning of the stages of the LAF is referred to as stacking the stages.

Each stage of the length absorption filter absorbs a different portion of the spectral energy band contained in the radiation beam. There are two factors that determine which portion of the spectral energy band a specific stage absorbs: the length of the stage and its position in the stack. In the embodiment of FIG. 2, each stage of the detector is a different length, L1 through L4. The position of each section in the stack is such that the stage with the shortest length is positioned closest to the energy source while the stage with the longest length is positioned farthest away from the source. The remaining sections, L2 and L3, are positioned sequentially according to size from smaller to larger.

An insulating material 210 is placed between each of the segments of electrode 200 to electrically isolate each segment of the electrode from its neighboring segment. This can be a standard type of insulation which is capable of preventing current flow between segments. In the preferred embodiment, the length absorption filter has been implemented with a centrally located electrode 200. However, one should know that other electrode configurations can be used without changing the functionality of invention. An alternative embodiment of electrode 200 may be the use of parallel plate electrodes.

The ion chamber is filled with a particular gas maintained at a specific temperature and pressure. The polychromatic radiation beam 104 enters the first stage of length L1, which is the shortest in length. This stage absorbs the lower frequency components of the spectrum since it is shortest in length. The higher frequency components of the spectrum pass through this first stage and enter the next stage with length L2, which is the stage with the next successive length. Stage L2 absorbs a higher frequency band of the polychromatic radiation beam 108 than the first stage L1 absorbed. However, the frequency range absorbed is lower than the frequency which will be absorbed by the remaining stages in the stack due to the fact that these remaining stages have longer lengths. This process of absorbing the lower frequency components and passing the higher frequency components continues for each of the stages in the length absorption filter radiation detector 110.

Figure 3:
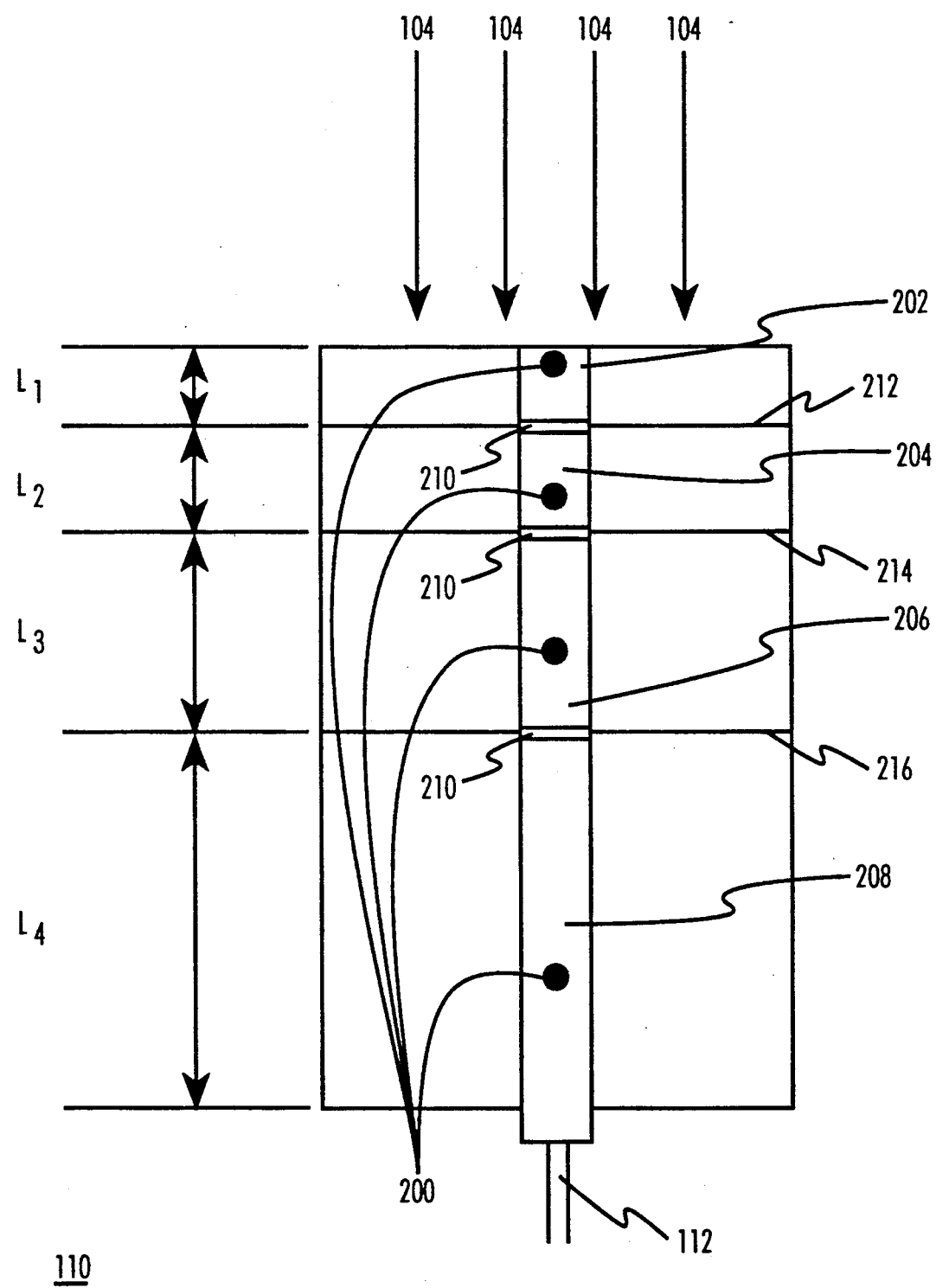
FIG. 3 is a side perspective view of a length absorption filter radiation detector implemented as a multistage ion chamber containing variable length stages physically separated from each other.

FIG. 3 illustrates length absorption filter radiation detector 110 implemented as a multi-stage ion chamber having physical separators between each of the stages. Here, each stage of the ion chamber may contain a different gas maintained at a different pressure due to separators 212, 214, and 216. These separators are impermeable by the gases enclosed in the ion chamber. However, the separators 212 through 216 do not filter the polychromatic radiation beam 108 as it passes through the length absorption filter.

The length absorption filter may be implemented as a multi-stage ion chamber as described in the preferred embodiment. However, one should know that the length absorption filter radiation detector 110 may be implemented with any radiation absorption material available. For example, scintillator crystals may be stacked in a similar manner as the multi-stage ion chamber. In such an embodiment, each crystal will absorb a different part of the polychromatic radiation beam 108 and enable the remaining frequencies to pass through and be absorbed by the remaining scintillator crystals in the stack.

The length of each stage of the length absorption filter, its position in the stack, and the number of stages used in the ion chamber are dependent upon the radiation source 102 which is used, the accuracy desired, and the number of alloys in the material to be measured. In the preferred embodiment, each stage of the length absorption filter is a different length and the stages are arranged in sequential order according to size. Each section also contains the same radiation absorption material. However, one should know that each stage of the length absorption filter may be of the same or different length, may contain the same or different radiation material and may stacked in any order.

The length of a transmission medium is the distance the radiation travels as it passes through the medium, and determines which energy band of the polychromatic radiation is absorbed by the medium. The distance that the radiation beam travels in the medium is referred to as the thickness of the medium. Generally, the propagation of radiation through a transmission medium of thickness (t), has an intensity (I) of $$I = I_o e^{-\alpha t} \quad (1)$$

where
$\alpha$ = thickness absorption coefficient
$I_o$ = Initial Intensity

The thickness absorption coefficient ($\alpha$) is a function of frequency and therefore varies with each of the energy bands that may pass through a given material.

When measuring an alloy with variable composition, each of the elements will be in different quantities or percentages. Each elements has a different absorption coefficient for each of the energy bands of the polychromatic radiation beam. Given a sheet material consisting of N total elements exposed to a polychromatic X-radiation of M specific energy bands, each element in the material will have an absorption coefficient associated with the $m^{th}$ energy band. Applying the relationship above, the beam intensity is related to the thickness of the material by $$I_{mn} = I_{0m} e^{-\alpha_{mn} t_n} \quad (2)$$

where
$\alpha_{mn}$ = Absorption coefficient for element $E_n$ in the $m^{th}$ energy band
$I_{mn}$ = Intensity of the $m^{th}$ spectral band for element $E_n$
$I_{0m}$ = Incident intensity of the $m^{th}$ spectral band
$t_n$ = Thickness of element $E_n$ The incident intensity of the $m^{th}$ spectral band, $I_{0m}$, is the intensity of the radiation beam at the $m^{th}$ energy band measured with no material in the inspection field. These values are measured and stored in computing means 116.

Taking the example of a material consisting of two elements, $E_1$ and $E_2$, the intensity for the two materials at two different energy levels is given below.

For element $E_1$ the intensities for energy levels 1 and 2 are given by $$I_{11} = I_{01} e^{-\alpha_{11} t_1} \quad (3)$$

$$I_{21} = I_{02} e^{-\alpha_{21} t_1} \quad (4)$$

For element $E_2$ the intensities for the different energy levels are given by $$I_{12} = I_{01} e^{-\alpha_{12} t_2} \quad (5)$$

$$I_{22} = I_{02} e^{-\alpha_{22} t_2} \quad (6)$$

For a given intensity using only a single spectral energy band, for example, the $m=1$ spectral band, the element involved is indeterminable because there are two variables: the element's thickness absorption coefficient ($\alpha$), and the thickness of the material (t) while there is only one equation. In other words, the intensity for two elements of a given energy band $m=1$ are equal, or $I_{11} = I_{12}$. However, a second set of intensity readings may be used as long as the intensities are not equal. In other words, $I_{21}$ does not equal $I_{22}$. Substitutions and rearranging yields $$I_{02} e^{-\alpha_{12} t_1} \neq I_{02} e^{-\alpha_{22} t_2} \quad (7)$$

$$\alpha_{21} t_1 \neq \alpha_{22} t_2$$

since $I_{11} = I_{12}$ $$\alpha_{12} t_2 = \alpha_{11} t_1$$

$$\frac{\alpha_{11}}{\alpha_{21}} \neq \frac{\alpha_{12}}{\alpha_{22}}$$

where
$\alpha_{11}$ = absorption coefficient in band 1 of element 1
$\alpha_{21}$ = absorption coefficient in band 2 of element 1
$\alpha_{12}$ = absorption coefficient in band 1 of element 2
$\alpha_{22}$ = absorption coefficient in band 2 of element 2

This last result is the element determination condition. Elemental analysis of alloys can be spectrally determined only if the ratio of the thickness absorption coefficients for different energy bands for one element are different than that same ratio for the other element(s). This relationship has been developed for a material consisting of two alloys. However, one should know that similar equations can be derived for three or more materials and combinations of materials.

Given two energy bands, which is the necessary minimum number of bands to determine the thickness of a two element alloy, the total radiation intensity which has penetrated through the alloy in each energy band is the sum equations 3 and 5. In order to reduce the number of variables of unknown value in equations 3 and 5, the percentage of each element contained in the material is used.

The summation of the percentage of each element contained in the material is, of course, 100%. For the two element example, $$P_1 + P_2 = 1 \quad (8)$$

where
$P_1$ = percentage of element 1 in the alloy
$P_2$ = percentage of element 2 in the alloy For energy band $m=1$, the total intensity $I_1$ is given by:

$$I_1 = I_{01} e^{(P_1 \alpha_{11} + P_2 \alpha_{12}) t} \quad (9)$$

$$I_2 = I_{02} e^{(P_1 \alpha_{21} + P_2 \alpha_{22}) t} \quad (10)$$

where
$\alpha_{11}$ = absorption coefficient in band 1 of element 1
$\alpha_{21}$ = absorption coefficient in band 2 of element 1
$\alpha_{12}$ = absorption coefficient in band 1 of element 2
$\alpha_{22}$ = absorption coefficient in band 2 of element 2
$I_1$ = measured radiations intensity through material in band 1
$I_2$ = measured radiation intensity through material in band 2
$I_{01}$ = measured radiation intensity without material in band 1
$I_{02}$ = measured radiation intensity without material in band 2
t = thickness of the material From these the thickness is then $$t = \frac{-1}{P_1 \alpha_{11} + P_2 \alpha_{12}} \operatorname{Ln}\left(\frac{I_1}{I_{01}}\right) = \quad (11)$$

$$\frac{-1}{(P_1 \alpha_{21} + P_2 \alpha_{22})} \operatorname{Ln}\left(\frac{I_2}{I_{02}}\right)$$

From (8) and (11) we find $$P_1 = \frac{\alpha_{12} \frac{\operatorname{Ln}(I_2/I_{02})}{\operatorname{Ln}(I_1/I_{01})} - \alpha_{22}}{(\alpha_{21} - \alpha_{22}) - (\alpha_{11} - \alpha_{12}) \frac{\operatorname{Ln}(I_2/I_{02})}{\operatorname{Ln}(I_1/I_{01})}} \quad (12)$$

and from (8) we have $$P_2 = 1 - P_1 \quad (13)$$

Thus we can calculate the thickness t using (11) since all variables are now known.

As an example, if we use the theoretical data for a Xenon (Xe) filled length absorption filter, the element $E_1$ has absorption coefficients
$\alpha_{11} = 40.0$ cm$^{-1}$ for section $L_1$
$\alpha_{21} = 20.0$ cm$^{-1}$ for section $L_2$
and the corresponding coefficients for elements $E_2$ are $\alpha_{12} = 30.0$ cm$^{-1}$ for section $L_1$
$\alpha_{22} = 100$ cm$^{-1}$ for section $L_2$ The element determination condition (7) is then calculated:

$$\frac{\alpha_{11}}{\alpha_{21}} = 2.0 \neq \frac{\alpha_{12}}{\alpha_{22}} = .333$$

Given that the element determination condition is satisfied, the intensities are then measured for each of the energy bands in the absence of any material being present. Then the intensity is measured in the presence of the material in each of the radiation bands. From these measured intensities, a transmission ratio is developed for each of the energy bands:

$$\frac{I_1}{I_{01}} = 0.400$$

$$\frac{I_2}{I_{02}} = 0.300$$

then we can calculate the percentage of elements $E_1$ and $E_2$ in the alloy from (10) and (11)

$P_1 = 0.650$ or 65%
$P_2 = 0.350$ or 35% and finally the thickness of the alloy is $t = 0.0251$ cm.

Notice that in this case the alloy consisted of two elements. Therefore, the third stage of the length absorption filter was not used.

While the invention has been particularly shown and described with reference to a preferred embodiment thereof, it will be understood by those skilled in the art that various changes in form and details may be made therein without departing from the spirit and scope of the invention.

What is claimed is:

1. A system for continuously determining the thickness of a material by measuring the radiation transmission through the material, comprising:
   source means for generating a polychromatic radiation beam and for directing said polychromatic radiation beam onto a first side of the material, said generated polychromatic radiation beam having a plurality of energy bands and having sufficient energy to penetrate through the material;
   detector means positioned on a side of the material opposite from said source means for detecting a plurality of said energy bands of a received polychromatic radiation beam which has penetrated through the material, and for producing output electrical signals representing the intensity of each of said plurality of detected energy bands, said detector means having a plurality of stages of various lengths containing radiation absorption material stacked in such a manner that said received polychromatic radiation beam passes through each of said stages; and
   processor means for continuously computing the thickness of the material based on said output electrical signals.

2. The system of claim 1, wherein each of said stages of said detector means absorbs a certain portion of said energy bands based on the length of said stage and position of said stage in said stack.

3. The system of claim 1, wherein each of said stages of said detector means comprise an electrically insulated electrode transmitting said output electrical signals from said detector means, said electrical signals representing the intensity of said portion of said energy band absorbed by said stage of said detector means.

4. The system of claim 2, wherein said detector means further comprises a contiguous volume of space comprising all of said stages of said detector means.

5. The system of claim 4, wherein said radiation absorption material is comprised of a gas maintained at a specified pressure and temperature.

6. The system of claim 3, wherein said detector means further comprises a separation means for separating said stages of said detector means, said separation means being impermeable by said radiation absorption material and not filtering said received polychromatic radiation beam.

7. The system of claim 6, wherein said radiation absorption material is comprised of a gas maintained at a specified pressure and temperature.

8. The system of claim 7, wherein said stages of said detector means are comprised of different gases maintained at different pressures.

9. The system of claim 6, wherein said radiation absorption material is comprised of scintillating crystals.

10. The system of claim 6, wherein said stages of said detector means are sequentially arranged according to length such that the stage with the smallest length is positioned closest to said source means and the stage with the longest length is positioned farthest from said source means.

11. A system for continuously determining the thickness of a material by measuring the radiation transmission through the material, comprising:
    source means for generating a polychromatic X-radiation beam through the material; and
    detector means for detecting a plurality of energy bands of a received polychromatic X-radiation beam which has penetrated through the material, and for producing output electrical signals representing the intensity of each of said detected energy bands of said received polychromatic radiation beam;
    said detector means having an ion chamber containing at least one gas having a plurality of stages of different specified lengths sequentially arranged according to length, such that the stage with the smallest length is positioned closest to said source means and the stage with the longest length is positioned farthest from said source means.

12. The system of claim 11, wherein said ion chamber further comprises a separation means for separating said stages of said ion chamber, said separation means being impermeable by said gas and not filtering the received polychromatic radiation beam.

13. The system of claim 12, wherein said ion chamber is comprised of a single gas at a specified pressure and temperature.

14. A method for continuously measuring the thickness of a sheet material with a variable composition, comprising the steps of:
    directing a polychromatic radiation beam through the sheet material, said polychromatic radiation beam having a plurality of energy bands;
    detecting said polychromatic radiation beam with a length absorption filter after said radiation beam has penetrated through the sheet material;

selecting a specific plurality of energy bands to measure such that the elemental determination condition is satisfied;

measuring the intensity of said plurality of energy bands, the quantity of said measured energy bands being equivalent to the quantity of elements contained in said sheet material;

producing a sheet transmission ratio for each of said measured energy bands of radiation flux transmitted through the sheet material to radiation flux transmitted through the air in the absence of the sheet material;

calculating the percentage amount of all elements of the sheet material as a function of said transmission ratios and the absorption coefficients of the elements, comprising the steps of:

equating the measured intensity through the material in each of said measured energy bands, resulting in as many equations as there are elements in said material, and simultaneously solving said equations for the percentage of each element in said material; and calculating the thickness of the sheet based on said percentage amounts and said absorption coefficients of said plurality of elements present.

* * * * *

UNITED STATES PATENT AND TRADEMARK OFFICE
CERTIFICATE OF CORRECTION

PATENT NO. : 5,204,889            Page 1 of 2
DATED     : Apr. 20, 1993
INVENTOR(S) : John Kraybill It is certified that error appears in the above-indentified patent and that said Letters Patent is hereby corrected as shown below:

On column 7, line 47, replace $$"I_{02}\ e^{-\alpha_{12}t_1} \neq I_{02}\ e^{-\alpha_{22}t_2}"$$

with $$--I_{02}\ e^{-\alpha_{21}t_1} \neq I_{02}\ e^{-\alpha_{22}t_2}--.$$

On column 7, line 47, delete "(7)" at end of line;

On column 7, line 54, insert --(7)-- at end of line.

UNITED STATES PATENT AND TRADEMARK OFFICE
CERTIFICATE OF CORRECTION

PATENT NO. : 5,204,889
DATED : Apr. 20, 1993
INVENTOR(S) : John Kraybill

It is certified that error appears in the above-indentified patent and that said Letters Patent is hereby corrected as shown below:

On column 8, line 44, replace $$"t = \frac{-1}{P_1\alpha_{11} + P_2\alpha_{12})} Ln\left(\frac{I_1}{I_{01}}\right) - \frac{-1}{(P_1\alpha_{21} + P_2\alpha_{22})} Ln\left(\frac{I_2}{I_{02}}\right)"$$

with $$--t = \frac{-1}{(P_1\alpha_{11} + P_2\alpha_{12})} Ln\left(\frac{I_1}{I_{01}}\right) - \frac{-1}{(P_1\alpha_{21} + P_2\alpha_{22})} Ln\left(\frac{I_2}{I_{02}}\right)--.$$

Signed and Sealed this

Twelfth Day of April, 1994

Attest:

BRUCE LEHMAN

*Attesting Officer*  *Commissioner of Patents and Trademarks*